(12) United States Patent
Weber

(10) Patent No.: US 11,097,594 B2
(45) Date of Patent: Aug. 24, 2021

(54) HEATING, VENTILATION AND/OR AIR-CONDITIONING DEVICE FOR A MOTOR VEHICLE

(71) Applicant: VALEO KLIMASYSTEME GMBH, Bad Rodach (DE)

(72) Inventor: Jens Weber, Bad Rodach (DE)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 0 days.

(21) Appl. No.: 16/478,063

(22) PCT Filed: Jan. 16, 2018

(86) PCT No.: PCT/EP2018/051022
§ 371 (c)(1),
(2) Date: Jul. 15, 2019

(87) PCT Pub. No.: WO2018/130722
PCT Pub. Date: Jul. 19, 2018

(65) Prior Publication Data
US 2019/0359027 A1   Nov. 28, 2019

(30) Foreign Application Priority Data

Jan. 16, 2017   (DE) .................... 20 2017 100 199.7

(51) Int. Cl.
*B60H 1/00* (2006.01)
*F16B 5/06* (2006.01)

(52) U.S. Cl.
CPC ....... *B60H 1/00528* (2013.01); *F16B 5/0664* (2013.01)

(58) Field of Classification Search
CPC ... B60H 1/00528; B25B 27/00; F16B 5/0664; F16B 5/0012; F16B 5/0016; Y10T 403/7073; H05K 5/0013
See application file for complete search history.

(56) References Cited

U.S. PATENT DOCUMENTS

| 5,699,601 A * | 12/1997 | Gilliam ................... B25B 27/00 29/278 |
| 2011/0017742 A1 | 1/2011 | Sausen et al. |
| 2016/0236592 A1 * | 8/2016 | Peniche ............... B60N 2/0725 |

FOREIGN PATENT DOCUMENTS

| DE | 69619446 T2 | 7/2002 |
| DE | 10 2006 061703 A1 | 7/2008 |
| KR | 2013 0070846 A | 6/2013 |

OTHER PUBLICATIONS

International Search Report and Written Opinion in corresponding International Application No. PCT/EP2018/051022, dated May 17, 2018 (10 pages).

* cited by examiner

*Primary Examiner* — Robert Sandy
*Assistant Examiner* — Louis A Mercado
(74) *Attorney, Agent, or Firm* — Osha Bergman Watanabe & Burton LLP

(57) ABSTRACT

A heating, ventilation and/or air-conditioning device for a motor vehicle, including a first device component (10) which has a latching receptacle (12) with a receiving opening (14) for inserting a rigid latching tongue of a second device component which extends substantially along a mounting axis (24), wherein a first peripheral portion (16) of the receiving opening (14) is formed by a wall portion of the first device component (10) and wherein a second peripheral portion (18) of the receiving opening (14) that is opposite to the first peripheral portion (16) is designed to be substantially flexurally stiff, and third and fourth peripheral portions (20,22) which are situated peripherally between the first peripheral portion (16) and the second peripheral portion (18) are designed as a bending portions.

19 Claims, 2 Drawing Sheets

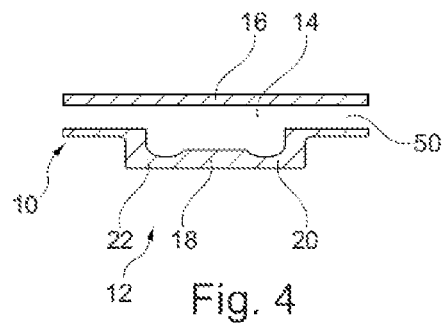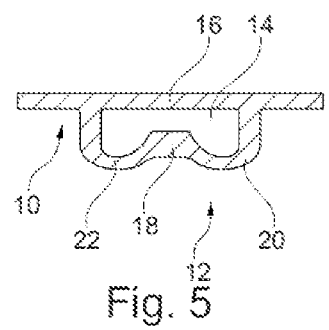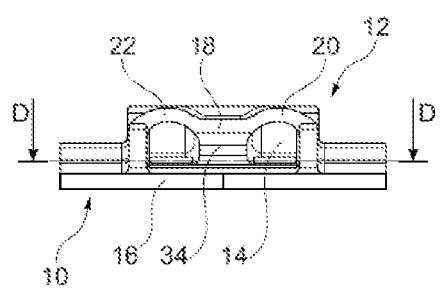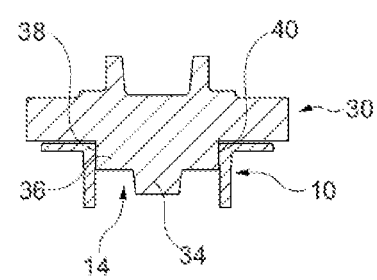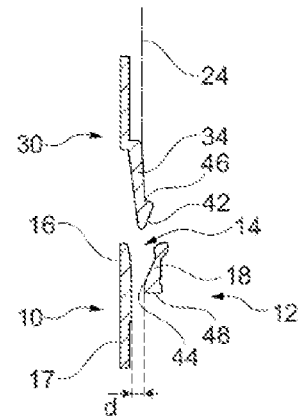

Figure 1:
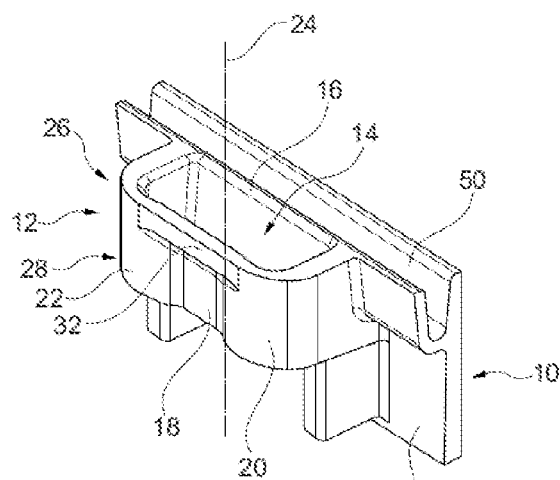

HEATING, VENTILATION AND/OR AIR-CONDITIONING DEVICE FOR A MOTOR VEHICLE

The invention relates to a heating, ventilation and/or air-conditioning device for a motor vehicle, comprising a first device component which has a latching receptacle with a receiving opening for inserting a latching tongue, wherein a first peripheral portion of the receiving opening is formed by a wall portion of the first device component, and a second device component which has a substantially rigid latching tongue which extends substantially along a mounting axis, wherein the two device components can be moved towards one another along the mounting axis in order to form a latching connection by means of the latching tongue and the latching receptacle.

Such heating, ventilation and/or air-conditioning devices are known in the prior art. They are used, for example, in ventilation units for motor vehicles. Furthermore, they can be constituent parts of air-conditioning units and/or vehicle heating systems.

The device components are then housing parts and/or air duct parts which are latched with one another in the course of mounting the heating, ventilation and/or air-conditioning device.

In the case where the device components are air-channelling or, in more general terms, fluid-channelling, they must additionally be sealed with respect to one another.

A device designed as a ventilation system is known from DE 696 19 446 T2. In that document, two housing components of a ventilation system are coupled by means of a tongue and groove connection and a snap tongue connection. As far as the snap tongue connection is concerned, what thus occurs during the joining of the two housing components is that the receiving opening is widened by the snap tongue and an associated edge is bent. Only thus is it possible for a latching member of the snap tongue to be coupled with the receiving opening.

The material in which the receiving opening is arranged can be locally overstressed as a result of the widening. This can have negative consequences for the durability of the snap tongue connection or latching connection. At the same time, it is thus made more difficult for a defined force for latching and unlatching to continue to be provided even after a number of latching operations.

The object of the invention is therefore to provide an improved heating, ventilation and/or air-conditioning device for a motor vehicle. It is particularly intended in this context for the aforementioned disadvantages to be avoided. A latching connection of the heating, ventilation and/or air-conditioning device is thus intended to be durable and should still be latchable by means of a defined latching force or mounting force and unlatchable by means of a defined unlatching force or demounting force even after a plurality of latching operations. Furthermore, the latched components should be securely and reliably connected to one another by means of such a latching connection.

The object is achieved by a heating, ventilation and/or air-conditioning device of the type stated at the outset in which a second peripheral portion of the receiving opening that is opposite to the first peripheral portion is designed to be substantially flexurally rigid, and a third peripheral portion which is situated peripherally between the first peripheral portion and the second peripheral portion is designed as a bending portion. Thus, unlike in the prior art, there occurs no widening or expansion of the edge of the receiving opening. Instead, the bending portion is bent during latching. Thus, the deformation of the receiving opening is realized at a defined point specifically configured for this purpose. An overloading by deformation is thus effectively avoided. The bending occurs here only elastically such that, even after a number of latching operations, the same forces always act during latching and unlatching. Such a heating, ventilation and/or air-conditioning device is thus particularly durable and is predictable in its behaviour in terms of the acting forces even after a number of latching operations. Moreover, the latching connection securely and reliably holds the components to be latched.

A fourth peripheral portion of the receiving opening is preferably designed as an additional bending portion, wherein the second peripheral portion is arranged between the third peripheral portion and the fourth peripheral portion, preferably adjoining the third peripheral portion and fourth peripheral portion. The flexurally rigid peripheral portion is thus situated between two bending portions. The receiving opening can thus behave symmetrically both geometrically and in terms of forces during latching and unlatching. The flexurally rigid peripheral portion can then be parallel to the opposite wall portion in each deformation state. There results a heating, ventilation and/or air-conditioning device which can be produced in a particularly simple manner and can be set particularly well in terms of the acting latching and unlatching forces. In addition, such a heating, ventilation and/or air-conditioning device is particularly durable and reliable.

The third peripheral portion and/or the fourth peripheral portion, as viewed along the mounting axis, can be at least partially arcuate. Here, the arc shape can vary along the mounting axis. The third and/or the fourth peripheral portion are or is particularly well adapted to loading in bending by virtue of the fact that the geometry and the material of the arcuate portions are correspondingly chosen. A long service life is thereby ensured.

In one embodiment, the third peripheral portion and/or the fourth peripheral portion are or is opposite to the first peripheral portion. According to the invention, the second peripheral portion is likewise opposite to the wall portion, with the result that the second, third and fourth peripheral portion can lie substantially on one line. Such a heating, ventilation and/or air-conditioning device is advantageous in terms of the freedom of movement of the third and/or fourth peripheral portion that is required during latching and unlatching. Furthermore, the peripheral portions can thus be arranged close to a wall portion of one of the device components. There thus results overall a compact design.

The flexurally rigid second peripheral portion can have arranged thereon a latching receptacle-side latching surface which, in the latched state, interacts with a latching tongue-side latching surface arranged on the latching tongue. What is meant by a latching surface in this context is a surface which, in a latched state, positively blocks a separation of the two device components. Secure and reliable latching of the two device components is consequently provided. In addition, the latching and the deformation occur in different peripheral portions, with the result that a long service life is achieved.

Furthermore, the flexurally rigid second peripheral portion can have arranged thereon a latching receptacle-side insertion surface which, during formation of the latching connection, interacts with a latching tongue-side insertion surface arranged on the latching tongue. Here, the two insertion surfaces slide on one another during formation of the latching connection and thereby facilitate the latching of the two device components. The latching connection can thus be produced simply. Moreover, a reproducible latching and unlatching behaviour is ensured by virtue of the fact that the latching receptacle-side insertion surface is provided on a peripheral portion which is not deformed during latching.

Advantageously, a stiffness of the latching receptacle varies along the mounting axis, wherein preferably a first portion of the latching receptacle which faces the second device component along the mounting axis is stiffer than a second portion of the latching receptacle which faces away from the second device component along the mounting axis. It is thus possible for a force necessary for the latching to be set in dependence on a relative position of the two device components with respect to one another along the mounting axis. The same applies to the unlatching of the two device components. In addition, the deformation of the receiving opening can also be influenced via the stiffness in such a way that an overstressing of the material is reliably avoided.

The latching receptacle-side latching surface is preferably arranged on the second portion. The latching surface is thus arranged on that portion which is less stiff. This results in effortless unlatching and latching being facilitated without compromising the reliable holding-together of the two components latched with one another.

A reinforcing rib can be arranged on the first portion. The reinforcing rib increases the stiffness of the first portion and thus also sets a deformability of the first portion that is intended to be lower relative to the second portion. The latching and unlatching forces can thus be set in a simple manner.

In a design variant, the latching tongue has arranged thereon a positioning element which, in the latched state of the first device component and the second device component, bears substantially with two opposite sides against the inner periphery of the receiving opening. The positioning element thus prevents the first device component from being displaced with respect to the second device component in the latched state. In particular, a displacement along the direction of a wall portion can thus be effectively prevented. The two device components can thus be positioned precisely and with repeatable accuracy with respect to one another.

In a development, at least one of the device components is a housing part of a device housing, wherein preferably one of the device components is a housing upper part and the other of the device components is a housing lower part. It is thus possible in the manner described for the housing upper part and the housing lower part to be latched with one another and also unlatched again in a reliable and durable manner.

At least one of the device components can be an air duct part. Thus, the air duct can be latched with respect to another air duct part and/or a housing part. Such a latching connection is durable and reliable.

In addition, the first device component and the second device component can be coupled via a tongue and groove connection in the latched state. Consequently, the two device components can be effectively sealed with respect to one another. This is particularly advantageous for air- and/or fluid-channelling components of a heating, ventilation and/or air-conditioning device.

The latching tongue and the receiving opening can each have a substantially rectangular cross section along the mounting axis. Such a cross section allows the receiving opening and the latching tongue to be configured in a space-saving manner. At the same time, they can be adapted in terms of their mechanical stiffness and strength to the acting forces. In particular, here, the in each case long side of the rectangular cross section extends along the first peripheral portion or along a wall portion.

According to one embodiment, a mounting force for forming the latching connection and/or a demounting force for releasing the latching connection can be set by a wall thickness of the third peripheral portion and/or of the fourth peripheral portion. Here, a relatively large wall thickness produces a high mounting force and/or a high demounting force. A relatively small wall thickness results in a small mounting force and/or a small demounting force. The desired mounting and/or demounting force can thus be fixed in a simple manner for each application.

In one embodiment, a first inspection surface is arranged on the first device component and a second inspection surface is arranged on the second device component, wherein the inspection surfaces are situated perpendicularly to the mounting axis and, in the latched state of the first device component and the second device component, have a defined spacing from one another. It is possible by monitoring this spacing for correct latching of the two device components to be ensured. The spacing can be optically detected for example in that, with corresponding illumination, the spacing, which is then a slot, appears darker than the surrounding areas. As a result, automated monitoring of the correct latching is possible in a simple manner.

With preference, the latching tongue is produced in one piece with the second device component and/or the latching receptacle is produced in one piece with the first device component. Simple and cost-effective production of the latching tongue and/or of the latching receptacle is thus possible.

According to a variant, a distance between the second peripheral portion and the first peripheral portion of the receiving opening is temporarily increased during formation of the latching connection. For this purpose, the bending portions are bent. The spacing serves to guide the latching tongue and the latching tongue-side latching surface arranged thereon through the receiving opening. A reliable latching connection can thus be produced.

Figures 2, 3:
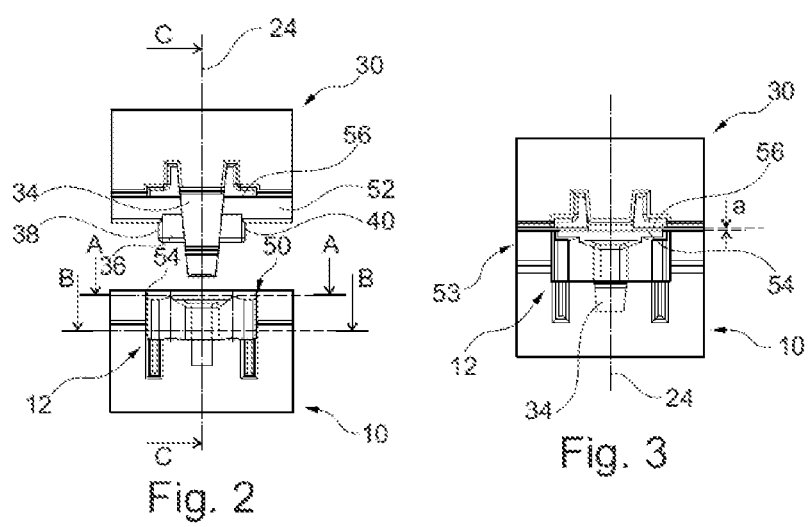

The invention is explained below with reference to the appended drawings, in which:

FIG. 1 shows a latching receptacle of a first device component of a heating, ventilation and/or air-conditioning device according to the invention for a motor vehicle in a perspective view, FIG. 2 shows the first device component and a second device component of the heating, ventilation and/or air-conditioning device according to the invention from FIG. 1 in a front view, FIG. 3 shows the heating, ventilation and/or air-conditioning device according to the invention from FIG. 2, with the first and the second device component being latched with one another, FIG. 4 shows the heating, ventilation and/or air-conditioning device according to the invention from FIG. 2 in a sectional view along line A-A, FIG. 5 shows the heating, ventilation and/or air-conditioning device according to the invention from FIG. 2 in a sectional view along line B-B, FIG. 6 shows the heating, ventilation and/or air-conditioning device according to the invention from FIG. 3 in a plan view along a mounting axis, FIG. 7 shows the heating, ventilation and/or air-conditioning device according to the invention from FIG. 6 in a sectional view along line D-D, and FIG. 8 shows the heating, ventilation and/or air-conditioning device according to the invention from FIG. 2 in a sectional view along line C-C.

FIG. 1 shows a first device component 10 of a heating, ventilation and/or air-conditioning device for a motor vehicle.

A latching receptacle 12 with a receiving opening 14 is arranged on the first device component 10, the receiving opening 14 being designed for inserting a latching tongue and having substantially a rectangular cross section.

The receiving opening 14 comprises a first peripheral portion 16 which is formed by a wall portion 17 of the first device component 10.

The receiving opening 14 further comprises a second peripheral portion 18 which is situated opposite to the first peripheral portion 16 and is substantially flexurally stiff.

A third peripheral portion 20 of the receiving portion 14 is situated peripherally between the first peripheral portion 16 and the second peripheral portion 18 and is designed as a bending portion.

The same applies to a fourth peripheral portion 22, which is likewise situated peripherally between the first peripheral portion 16 and the second peripheral portion 18 and is designed as a bending portion.

In the embodiment illustrated, the second peripheral portion 18 adjoins the third peripheral portion 20 and the fourth peripheral portion 22.

In the peripheral direction, the various peripheral portions 16, 18, 20, 22 are thus arranged in the following order: first peripheral portion 16, third peripheral portion 20, second peripheral portion 18, fourth peripheral portion 22.

In the embodiment illustrated, the third peripheral portion 20 and the fourth peripheral portion 22 are arcuate if they are viewed along a mounting axis 24 which corresponds to a centre axis of the receiving opening 14 (see in particular FIG. 5).

In this arrangement, the third peripheral portion 20 and the fourth peripheral portion 22 are opposite to the first peripheral portion 16, exactly like the second peripheral portion 18 (see FIGS. 4 and 5).

The latching receptacle 12 is produced in one piece with the first device component 10 and in this respect is integrally formed on the wall portion 17 so as to be substantially U-shaped.

A stiffness of the latching receptacle 12 varies along the mounting axis 24.

In this connection, in the embodiment illustrated, a first portion 26 of the latching receptacle 12 is designed to be stiffer than a second portion 28 of the latching receptacle 12.

In a latched state, the first portion 26 faces a second device component 30 along the mounting axis 24 and the second portion 28 faces away from the second device component 30 (see FIGS. 2 and 3).

Furthermore, the first portion 26 is equipped with a reinforcing rib 32.

Apart from the first device component 10, FIGS. 2, 3 and 6-8 also illustrate the second device component 30 of the heating, ventilation and/or air-conditioning device for a motor vehicle.

The second device component 30 comprises a substantially rigid latching tongue 34 which extends substantially along the mounting axis 24. In the embodiment illustrated, the latching tongue 34 is produced in one piece with the second device component 30.

With respect to the mounting axis 24, the latching tongue 34 has a substantially rectangular cross section.

In addition, the latching tongue 34 has arranged thereon a positioning element 36 which can also be referred to as a positioning blade.

The positioning element 36 is designed in such a way that, in the latched state of the first device component 10 and the second device component 30, it bears with two opposite sides 38, 40 against the inner periphery of the receiving opening 14 (cf. FIG. 7).

A displacement of the first device component 10 relative to the second device component 30 in a direction transverse to the mounting axis 24 is thus prevented.

In order to latch the first device component 10 and the second device component 30 with one another, they are moved towards one another along the mounting axis 24.

The latching tongue 34 then engages in the receiving opening 14.

In order to facilitate the latching, a tongue-side insertion surface 42 is arranged on the latching tongue 34 and a latching receptacle-side insertion surface 44 is arranged on the latching receptacle 12.

When the first device component 10 and the second device component 30 are moved towards one another, the insertion surfaces 42, 44 initially come into contact and then slide on one another.

Within the latching receptacle 12, the insertion surface 44 is arranged on the second peripheral portion 18, which is flexurally rigid.

During the sliding movement of the insertion surfaces 42, 44, which is accompanied by the first device component 10 and the second device component 30 being moved further towards one another, the receiving opening is temporarily enlarged by virtue of the fact that a distance d between the second peripheral portion 18 and the first peripheral portion 16, which is formed by the wall portion 17, is temporarily increased.

This is ensured by a bending of the third peripheral portion 20 and of the fourth peripheral portion 22.

It is thereby made possible for a latching tongue-side latching surface 46 to engage with a latching receptacle-side latching surface 48.

The latching receptacle-side latching surface 48 is arranged on the second peripheral portion 18.

As far as the arrangement of the latching receptacle-side latching surface 48 along the mounting axis 24 is concerned, said latching surface is thus arranged on the second portion 28 of the latching receptacle 12.

If the latching tongue-side latching surface 46 and the latching receptacle-side latching surface 48 are opposite to one another, the first device component 10 and the second device component 30 are in the latched state (see FIGS. 3 and 6).

In the embodiment illustrated, the first device component 10 is additionally equipped with a groove 50 and the second device component 30 is additionally equipped with a tongue 52 such that, in the latched state of the device components 10, 30, a tongue and groove connection 53 is also formed between the two device components 10, 30. The two device components 10, 30 are thus also coupled via the tongue and groove connection 53.

In addition, a first inspection surface 54 is arranged on the first device component 10 and a second inspection surface 56 is arranged on the second device component 30.

The inspection surfaces 54, 56 extend substantially perpendicularly to the mounting axis 24.

As is illustrated in particular in FIG. 3, the two inspection surfaces 54, 56 have a defined spacing a from one another in the latched state of the device components 10, 30. It is thus possible to check that the device components 10, 30 have been correctly latched by monitoring this spacing a.

Demounting or unlatching is achieved by moving the device components 10, 30 apart from one another along the mounting axis 24.

In this connection, the positive engagement between the latching surfaces 46, 48 must be released.

This can take place either by pulling apart the device components 10, 30 by means of a sufficient force and/or through the use of a suitable tool by means of which the distance d between the first peripheral portion 16 and the second peripheral portion 18 can be increased.

The forces which are necessary to form the latching connection, that is to say the mounting force, and/or to release the latching connection, that is to say the demounting force, can be set in a simple manner by changing the wall thickness of the third peripheral portion 20 and/or of the fourth peripheral portion 22.

In this connection, the mounting force and/or the demounting force increase if the wall thickness of the third peripheral portion 20 and/or of the fourth peripheral portion 22 is increased.

If the wall thickness of the third peripheral portion 20 and/or of the fourth peripheral portion 22 is decreased, the mounting force and/or the demounting force are or is reduced.

The device components 10, 30 have been explained with general validity, but can be, for example, housing parts of a device housing, with one of the device components 10, 30 being a housing upper part and the other of the device components 10, 30 being a housing lower part.

Furthermore, at least one of the device components 10, 30 can be an air duct part.

Combinations are also possible such that, for example, the first device component 10 is a housing part and the second device component 30 is an air duct part which is latched with the housing part.

The invention claimed is:

1. A heating, ventilation and/or air-conditioning device for a motor vehicle, comprising:
    a first device component which has a latching receptacle with a receiving opening for inserting a latching tongue, wherein a first peripheral portion of the receiving opening is formed by a wall portion of the first device component; and
    a second device component which has a substantially rigid latching tongue which extends substantially along a mounting axis,
    wherein a stiffness of the latching receptacle varies along the mounting axis,
    wherein the first and second device components can be moved towards one another along the mounting axis to form a latching connection by means of the latching tongue and the latching receptacle,
    wherein a second peripheral portion of the receiving opening that is opposite to the first peripheral portion is configured to be substantially flexurally stiff, and a third peripheral portion which is situated peripherally between the first peripheral portion and the second peripheral portion is configured as a bending portion, and
    wherein the first device component and the second device component are coupled via a tongue and groove connection in a latched state.

2. The device according to claim 1, wherein a fourth peripheral portion of the receiving opening is as an additional bending portion, wherein the second peripheral portion is arranged between the third peripheral portion and the fourth peripheral portion adjoining the third peripheral portion and fourth peripheral portion.

3. The device according to claim 2, wherein the third peripheral portion and/or the fourth peripheral portion, as viewed along the mounting axis, are or is at least partially arcuate.

4. The device according to claim 2, wherein the third peripheral portion and/or the fourth peripheral portion are or is situated opposite to the first peripheral portion.

5. The device according to claim 2, wherein a mounting force for forming the latching connection and/or a demounting force for releasing the latching connection can be set by a wall thickness of the third peripheral portion and/or of the fourth peripheral portion.

6. The device according to claim 1, wherein the second peripheral portion that is configured to be substantially flexurally stiff has arranged thereon a latching receptacle-side latching surface which, in the latched state, interacts with a latching tongue-side latching surface arranged on the latching tongue.

7. The device according to claim 6, wherein a first portion of the latching receptacle which faces the second device component along the mounting axis is stiffer than a second portion of the latching receptacle which faces away from the second device component along the mounting axis.

8. The device according to claim 7, wherein the latching receptacle-side latching surface is arranged on the second portion.

9. The device according to claim 7, wherein a reinforcing rib is arranged on the first portion.

10. The device according to claim 1, wherein the second peripheral portion that is configured to be substantially flexurally stiff has arranged thereon a latching receptacle-side insertion surface which, during formation of the latching connection, interacts with a latching tongue-side insertion surface arranged on the latching tongue.

11. The device according to claim 1, wherein the latching tongue has arranged thereon a positioning element which, in the latched state of the first device component and the second device component, bears substantially with two opposite sides—against an inner periphery of the receiving opening.

12. The device according to claim 1 wherein at least one of the device components is a housing part of a device housing, wherein preferably one of the device components is a housing upper part and the other of the device components is a housing lower part.

13. The device according to claim 1, wherein at least one of the first and second device components is an air duct part.

14. The device according to claim 1, wherein the latching tongue and the receiving opening each have a substantially rectangular cross section along the mounting axis.

15. The device according to claim 1, wherein a first inspection surface is arranged on the first device component and a second inspection surface is arranged on the second device component, wherein the inspection surfaces are situated perpendicularly to the mounting axis and have a defined spacing from one another in the latched state of the first device component and the second device component.

16. The device according to claim 1, wherein the latching tongue is produced in one piece with the second device component and/or the latching receptacle is produced in one piece with the first device component.

17. The device according to claim 1, wherein a distance between the second peripheral portion and the first peripheral portion of the receiving opening is temporarily increased during formation of the latching connection.

18. A heating, ventilation and/or air-conditioning device for a motor vehicle, comprising:
- a first device component which has a latching receptacle with a receiving opening for inserting a latching tongue, wherein a first peripheral portion of the receiving opening is formed by a wall portion of the first device component; and
- a second device component which has a substantially rigid latching tongue which extends substantially along a mounting axis,
- wherein a stiffness of the latching receptacle varies along the mounting axis,
- wherein the first and second device components can be moved towards one another along the mounting axis to form a latching connection by means of the latching tongue and the latching receptacle,
- wherein a second peripheral portion of the receiving opening that is opposite to the first peripheral portion is configured to be substantially flexurally stiff, and a third peripheral portion which is situated peripherally between the first peripheral portion and the second peripheral portion is configured as a bending portion, and
- wherein a distance between the second peripheral portion and the first peripheral portion of the receiving opening is temporarily increased during formation of the latching connection.

19. A heating, ventilation and/or air-conditioning device for a motor vehicle, comprising:
- a first device component which has a latching receptacle with a receiving opening for inserting a latching tongue, wherein a first peripheral portion of the receiving opening is formed by a wall portion of the first device component; and
- a second device component which has a substantially rigid latching tongue which extends substantially along a mounting axis,
- wherein the first and second device components can be moved towards one another along the mounting axis to form a latching connection by means of the latching tongue and the latching receptacle,
- wherein a second peripheral portion of the receiving opening that is opposite to the first peripheral portion is configured to be substantially flexurally stiff, and a third peripheral portion which is situated peripherally between the first peripheral portion and the second peripheral portion is configured as a bending portion,
- wherein the first device component and the second device component are coupled via a tongue and groove connection in a latched state, and
- wherein the latching tongue has arranged thereon a positioning element which, in the latched state of the first device component and the second device component, bears substantially with two opposite sides—against an inner periphery of the receiving opening.

* * * * *